Figure 1:
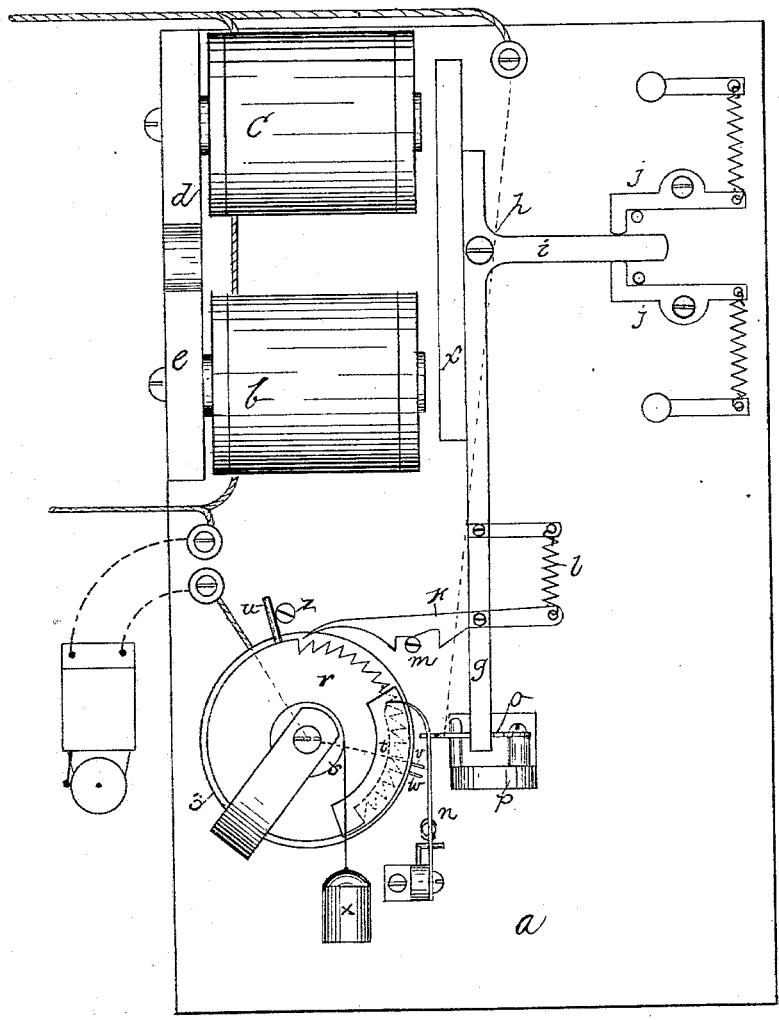

(No Model.) 3 Sheets—Sheet 1.

A. L. MERRICK & B. BROOKS.
J. MERRICK, Administratrix of A. L. MERRICK, Deceased.
SELECTIVE SYSTEM.

No. 566,784. Patented Sept. 1, 1896.

WITNESSES:
E. M. Tower
D. B. Hale

INVENTORS
Benjamin Brooks
Arthur L. Merrick
By Allen Webster
ATTORNEY (No Model.) 3 Sheets—Sheet 2.
A. L. MERRICK & B. BROOKS.
J. MERRICK, Administratrix of A. L. MERRICK, Deceased.
SELECTIVE SYSTEM.
No. 566,764. Patented Sept. 1, 1896.
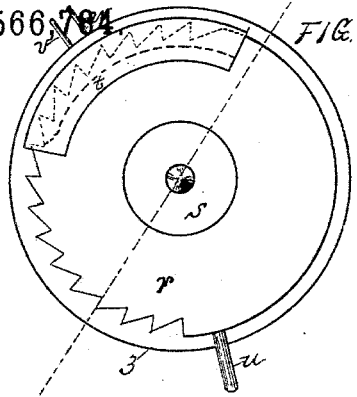
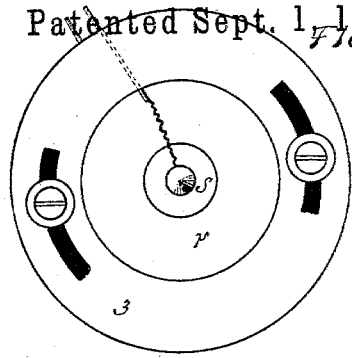
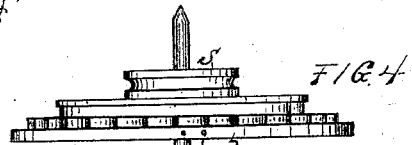
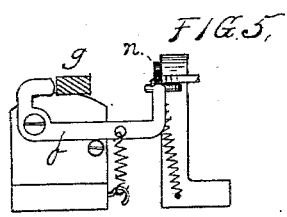
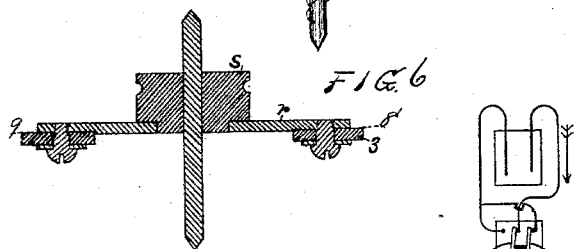
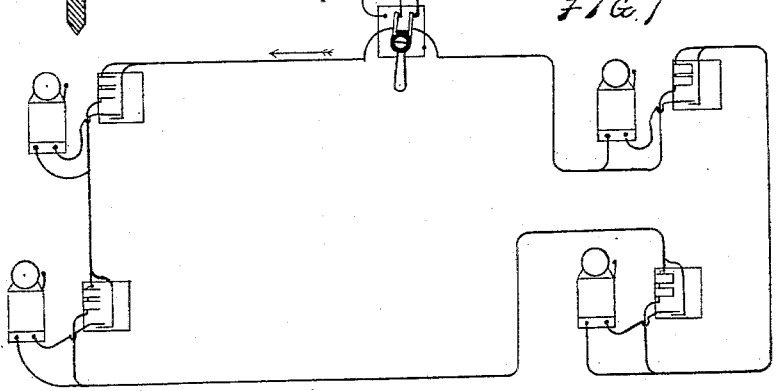
WITNESSES:
E. M. Tower
D. B. Hale
INVENTORS
Benjamin Brooks
Arthur L. Merrick
By Allen Webster
ATTORNEY (No Model.) 3 Sheets—Sheet 3.
A. L. MERRICK & B. BROOKS.
J. MERRICK, Administratrix of A. L. MERRICK, Deceased.
SELECTIVE SYSTEM.
No. 566,784. Patented Sept. 1, 1896.
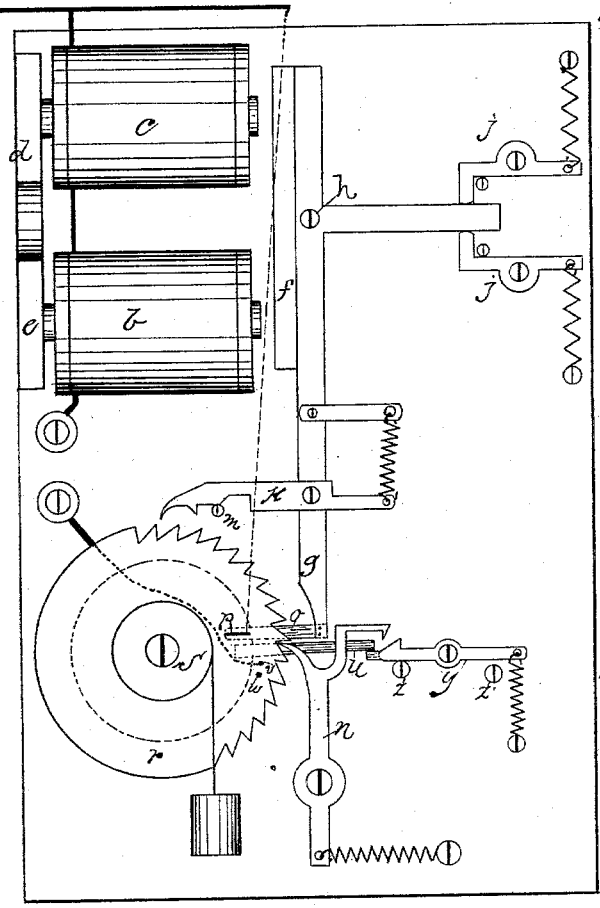
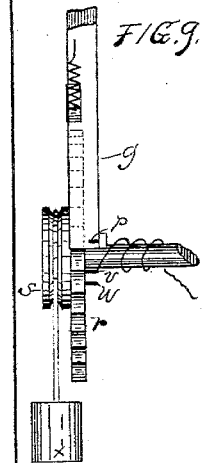
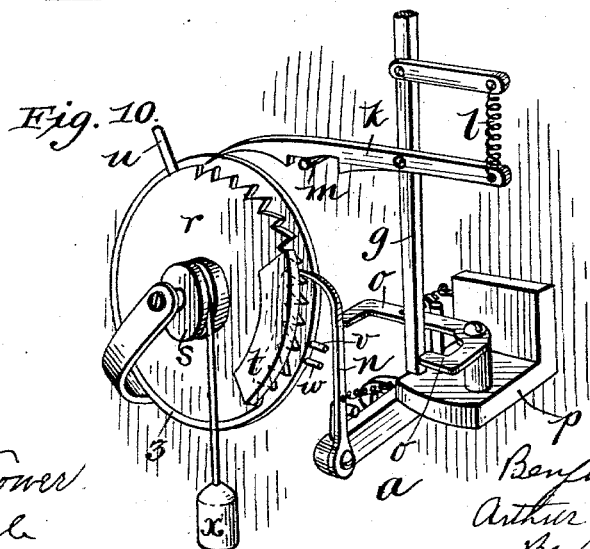

UNITED STATES PATENT OFFICE.

ARTHUR L. MERRICK AND BENJAMIN BROOKS, OF SPRINGFIELD, MASSACHUSETTS; JULIETTE MERRICK ADMINISTRATRIX OF SAID ARTHUR L. MERRICK, DECEASED.

SELECTIVE SYSTEM.

SPECIFICATION forming part of Letters Patent No. 566,784, dated September 1, 1896.

Application filed September 16, 1892. Serial No. 446,066. (No model.)

*To all whom it may concern:*

Be it known that we, ARTHUR L. MERRICK and BENJAMIN BROOKS, citizens of the United States of America, residing in Springfield, Hampden county, Massachusetts, have invented new and useful Improvements in Individual Selective Systems for Telephones, Electric Lights, Electric Signals, &c., of which the following is a specification, reference being had to the accompanying drawings and letters of reference marked thereon.

The object of our invention is to provide a system and mechanism for operating the same by which a signal may be given from one station to any one of several other stations in one electrical circuit, or by which any of several lights may be put in operation or extinguished from one station, they all being connected in one electrical circuit; or, in other words, our invention consists in a system and operative mechanism by which certain different motions may be given at any one of several stations in the same electrical circuit, and by which motion so given a signal may be caused to sound or operate, a light operated, or other desirable results accomplished.

In the accompanying drawings, in which like letters of reference indicate like parts, Figure 1 is a plan view of one form of device adapted by us to accomplish the desired result. Fig. 2 is a side view of the ratchet or toothed wheel detached from the rest of the device and shown on an enlarged scale. Fig. 3 is a view as seen from the side opposite that shown in Fig. 2. Fig. 4 is an edge view of the same. Fig. 5 is a detached view of the lever employed in the construction shown in Fig. 1, which operates to throw the retaining-pawl out of engagement with the toothed wheel and which operates to make the necessary contact and complete the circuit when the toothed wheel is in the proper position for that purpose. Fig. 6 is a sectional view of the ratchet or toothed wheel detached. Fig. 7 is a diagram illustrative of the application of our invention to a telephone system. Fig. 8 is a plan view of a modification, and Fig. 9 is an edge view of the same, and Fig. 10 is a perspective view of the lower part of Fig. 1.

In detail, $a$ indicates a supporting-base; $b$ and $c$, electromagnets; $d$ and $e$, the poles of an ordinary permanent horseshoe-magnet; $f$, a soft-iron bar or armature mounted upon the armature-support $g$, which in turn is pivotally mounted at $h$; $i$, an arm mounted upon piece $g$; $j$, ordinary retaining-levers adapted to maintain the arm $i$ normally in one position; $k$, a pawl pivotally mounted upon the part $g$; $l$, a spring to maintain the pawl in the desired position; $m$, a pin to limit and control the motion of the pawl; $n$, a retaining-pawl; $o$, a bell-crank lever; $p$, a post upon which the same is pivotally mounted; $r$, a toothed or ratchet wheel; $s$, a pulley mounted thereon; $t$, a plate mounted upon the toothed wheel and covering the guide-track, which the nose of the retaining-pawl $n$ traverses when the ratchet-wheel returns to its normal position; $v$, a pin mounted in the periphery of the hard-rubber wheel and electrically connected with the post by which said wheel is supported; $w$, a guard-pin mounted in the periphery of the hard-rubber ring adjacent to the contact-pin $v$ and adapted to prevent electrical contact.

The construction and operation are as follows:

We are enabled to obtain two distinct motions, or, in other words, one positive motion in one direction and one positive motion in the opposite direction, over one wire by the employment of polarized apparatus and by the employment of mechanism by which a step-by-step motion is produced, thus causing the toothed wheel to be revolved a distance equal to one tooth at each impulse, and when the desired position has been reached by the toothed wheel electrical contact is made by the employment of the positive motion in a direction the reverse of that employed to move the toothed wheel, so that when the desired point is reached the connection will be made and the desired signal sounded or such other operation be performed as the device may be especially adapted for.

In the drawings we have illustrated a base

*a*, upon which is suitably mounted two electromagnetic coils *b* and *c*, each having a soft-iron core, one end of each core being fastened to one pole of a common permanent horseshoe-magnet *d e*.

Pivotally mounted adjacent to the opposite end of said cores we arrange a soft-iron bar *f*, the same being mounted upon the armature-support *g*, which is pivotally mounted at *h* and is provided with an arm *i*, arranged substantially at right angles, and is maintained in its normal position by the employment of the common well-known arrangement of retaining arms or levers *i*, pivotally mounted and provided with springs and having stops to limit their motion.

The armature-support *g* is extended in one direction, and upon it in the proper position we pivotally mount a pawl *k*, the same being provided with a spring *l* to normally carry the point of the pawl toward the wheel. The lower edge of the pawl is cut away and arranged to travel upon a pin *m*, the portion of the pawl which traverses the pin being so shaped that the point of the pawl is allowed to move toward the periphery of the toothed wheel sufficiently to engage one of the teeth, and after the wheel has been rotated a distance equal to the width of one tooth the nose of the pawl *k* is carried away from the periphery or out of contact with the tooth, and return movement of the wheel is prevented by the engagement of the retaining-pawl *n*.

The toothed wheel *r* is mounted upon a supporting pulley or wheel *s*, the wheel *s* being preferably made of hard rubber, thereby insulating the toothed wheel from the pivotal support. The toothed wheel has mounted upon it the hard-rubber ring 3, the same being made adjustable in any convenient manner.

A contact-pin *v* is mounted in the periphery of the hard-rubber ring 3, and may be electrically connected to the supporting-post by extending the pin downwardly and fastening it to the post, as shown in Fig. 4, or by carrying it directly through the ring to the post.

The retaining-pawl *n* is pivotally mounted upon a suitable support and is so constructed that its nose normally bears toward the periphery of the toothed wheel, and the pivotal connection allows the nose to be moved to one side out of engagement with the teeth. This pawl may be made of spring metal and the elasticity of the material relied upon to maintain the pawl in contact with the toothed wheel, or a spring may be employed for that purpose. A spring is also employed to maintain this pawl normally in the plane of the toothed wheel, while allowing it to be forced to one side and out of contact with the teeth. Upon one side of the toothed wheel and for a part of its circumference we provide a track or groove in which the nose of the retaining-pawl rests while the toothed wheel is being returned to its normal or first position. The bottom of this track is below the base of the teeth, excepting at the point where it is desired that the nose of the pawl should return to its position in the plane of the toothed wheel and into engagement with the teeth, at which point the bottom of the track is carried up at an incline to bring the nose of the pawl flush with the opening between the two teeth at this point, thus leaving the nose of the pawl free to return to its normal position in the plane of the toothed wheel and into engagement with the teeth.

A pin *u*, projecting from the toothed wheel, strikes against a stop *z* when the wheel is returned to its normal position, thus avoiding friction between the nose of the retaining-pawl and the wall of the groove in which it moves, leaving the pawl thus free to drop into its normal position without friction.

A weight mounted upon a cord wound upon the pulley *s* serves to return the toothed wheel, with parts mounted thereon, to their normal position when free to return. It will readily be seen, however, that a spring may be employed to take the place of the weight, or other suitable devices may be adapted to cause the return movement.

The bell-crank lever *o* is pivotally mounted upon a suitable support, one arm being arranged adjacent to the extension of the armature-support *g*, so that a movement of the extended portion in a direction away from the toothed wheel will cause the opposite arm of the bell-crank lever *o* to strike against the retaining-pawl *n* and throw it out of contact with the teeth of the toothed wheel and into the groove before described. It will now be seen that if the rotation of the toothed wheel is occasioned by the movement of the armature-support *g* in one direction, and the return movement permitted by a movement in the opposite direction, the device is so far under the control of the operator that by giving electrical impulses in one direction the toothed wheel may be rotated, while by giving an impulse in the opposite direction it may be released, and that it simply becomes necessary to so time the device to make the necessary electrical contact when the toothed wheel is in the proper position, and thus put in connection any one of several stations upon the same electrical circuit. This connection we prefer to make at the same time that the retaining-pawl is thrown out of engagement with the toothed wheel, and to make this engagement we put the bell-crank lever in the circuit, and whenever it is in contact with the contact-pin *v* the electrical circuit will be complete, so that whenever the bell-crank lever is operated it will serve to throw the retaining-pawl out of engagement, and if the toothed wheel is then in such position that the end of the lever *o* will pass between the contact-pin *v* and guard-pin *w* the necessary contact to complete the circuit for the station where that apparatus is located will be made and the signal will be sounded, or such other desirable effects produced as the apparatus may be adapted to accomplish, and to prevent any station being called excepting the one desired the guard-pin $w$ is inserted just back of the contact-pin $v$, so that if the retaining-pawl be thrown out of engagement and the toothed wheel be thereby free to begin its return movement the pin $w$ will come in contact with the bell-crank lever and prevent making contact.

The hard-rubber ring 3 is made adjustable upon the toothed wheel preferably by providing the ring with slots, as shown in Fig. 3, so that the position of the contact-pin with reference to the teeth upon the wheel may be regulated, and if the contact-pin $v$ be set a distance equal to one tooth only from the lever $o$ then but one impulse will be required to rotate the toothed wheel to such position that the lever $o$ will make the necessary contact when operated, and that if the hard-rubber disk 3 be rotated so as to carry the contact-pin $v$ a greater distance from the lever $o$ then a sufficient number of impulses will be required to rotate the toothed wheel the required distance to make the contact, the number of impulses of which would equal the number of teeth that the contact-pin was set from the lever $o$. One of these apparatus would, of course, be provided for each station, and as many stations may be connected in one circuit as the number of teeth in the toothed wheel will allow, and the hard-rubber ring 3 at each station would be set to carry the contact-pin a different number of teeth from the lever $o$, and contact would never be made at any station unless the position of the toothed wheel were such at the time the lever $o$ was operated as to carry the end of the lever $o$ between the contact-pin $v$ and the guard-pin $w$.

If now, for the purpose of illustration, it is desired to call up station 4, the hard-rubber ring 3 will be so adjusted upon the toothed wheel that the pin $v$ will be in position to be engaged by the bell-crank lever $o$ when the toothed wheel has been revolved a distance equal to four teeth. If the four impulses be given from the central station in a direction to cause the extended armature-support to be moved toward the toothed wheel, this wheel will be rotated a distance equal to four teeth, one impulse moving the wheel a distance of one tooth. Then the current is sent in the opposite direction, one impulse being sufficient and operating to cause the extended armature-support to be moved away from the toothed wheel, thus operating the bell-crank lever $o$ and throwing its outer or free end into position to bear against the contact-pin $v$, and at the same time throwing the retaining-pawl $n$ out of engagement with the teeth. The weight or spring which operates to return the toothed wheel to its normal position is then free to cause the toothed wheel to return a short distance until the contact-pin $v$ is in contact with the free end of the bell-crank lever, thus completing the circuit through the bell-crank lever $o$, contact-pin $v$, and supporting-stud and ringing the bell of a station 4, if it be included in the circuit, or performing such other operation as the device may be adapted for, which operation will be continued as long as the contact be so maintained, and when the bell-crank lever is allowed to return to its normal position the toothed wheel will then be free to return to its first position, as before described.

The bell may of course be in a shunt-circuit or in an auxiliary circuit.

The construction illustrated in Figs. 8 and 9 differs from the construction heretofore described in detail in that the retaining-pawl is not thrown out of the plane of the ratchet-wheel, but remains within the plane, and the retaining-pawl is held out of engagement with the ratchet-wheel by a latch $y$, and the contact is made through the lever $o$ at the same time the retaining-pawl is carried away from the ratchet-wheel by reason of the bar or projecting piece $p$ upon the arm or lever $o$, passing between the two pins $v$ and $w$, and the retaining-pawl is released and permitted to again engage the ratchet-wheel when the pin $u$, which is mounted in the hard-rubber ring, engages the free end of the latch $y$, thus throwing it out of engagement with the latch upon the retaining-pawl $n$.

It will readily be seen that very many other modifications may be made in the construction of our device whereby the same beneficial result may be accomplished, and we do not, therefore, limit ourselves to the special forms of construction herein illustrated.

Having therefore described our invention, what we claim, and desire to secure by Letters Patent, is—

1. The combination, in an individual selective system, of a polarized apparatus, an armature movable in two directions, a contact pin or plate adapted to be carried by the armature moving in one direction to the requisite position for connection, a circuit adapted to be closed by the contact-pin when the armature is moved in the opposite direction, a retaining-pawl disengaged simultaneously with the closing of the circuit, and means operating independently of the current to return said contact pin or plate to its normal position when rendered free to return by discontinuance of the current, substantially as described.

2. The combination of a suitable supporting-base, the coils $c$, $d$ mounted thereon, a permanent horseshoe-magnet $d$, $e$ connected to the cores of said coils, the soft-iron bar $f$ arranged adjacent to the opposite end of said cores, the armature-support $g$ pivotally mounted and having the soft-iron bar $f$ secured thereto, means to maintain the armature-support $g$ in its normal position while leaving it free to be moved in either direction, a pawl $k$ mounted upon the extended armature-support $g'$, a ratchet-wheel $r$, a retaining-pawl, an insulating-ring 3 provided with a contact-pin $v$ and guard-pin $w$, a lever $o$ arranged to engage the electrically-connected contact pin or plate of the ratchet-wheel $r$, operated by the same pulsation which throws the retaining-pawl out of engagement, and means to return the ratchet-wheel to its normal position when the retaining-pawl is disengaged therefrom, substantially as shown.

3. The combination, in an individual selective system, of a polarized apparatus, an armature moved by pulsations in one direction, contact devices arranged to be carried by said armature moving in one direction to the requisite position for connection, said armature being also moved by pulsations in the opposite direction, a circuit closed by the contact devices in the latter movement of the armature, a retaining-pawl disengaged simultaneously with the closing of the circuit, a stop blocking the return movement of the contact devices, and means operating independently of the current to return the mechanism to its normal position when rendered free to return by discontinuance of the current, substantially as described.

4. The combination of a supporting-arm $g$ having a soft-iron bar $f$ mounted thereon, means to turn said supporting-arm $g$ upon its pivot in either direction by electrical impulses, a ratchet as $r$ provided with a contact-pin insulated through the ratchet, operative mechanism mounted upon the supporting-arm $g$ to move the ratchet when the lever is moved in one direction, and means to make electrical contact and complete the circuit by the movement of the supporting-arm $g$ in the opposite direction and means operating independently of electric current to return the mechanism to its normal position when rendered free to return by discontinuance of the electric current, substantially as and for the purposes stated.

ARTHUR L. MERRICK.
BENJAMIN BROOKS.

Witnesses:
ALLEN WEBSTER,
E. M. TOWER.